US009951215B2

(12) United States Patent
Kannengiesser et al.

(10) Patent No.: US 9,951,215 B2
(45) Date of Patent: Apr. 24, 2018

(54) INJECTABLE COMPOSITE MATERIAL REINFORCED BY NATURAL FIBERS

(75) Inventors: Pauline Kannengiesser, Pontoise (FR); Embarka Aoudjit, Hem (FR); Laurence Dufrancatel, Herblay (FR); Sergio Da Costa Pito, Cergy (FR); Gérard Mougin, Meursault (FR)

(73) Assignee: Faurecia Interieur Industrie, Nanterre (FR)

( * ) Notice: Subject to any disclaimer, the term of this patent is extended or adjusted under 35 U.S.C. 154(b) by 704 days.

(21) Appl. No.: 13/978,696

(22) PCT Filed: Jan. 6, 2012

(86) PCT No.: PCT/EP2012/050179
§ 371 (c)(1), (2), (4) Date: Sep. 12, 2013

(87) PCT Pub. No.: WO2012/093167
PCT Pub. Date: Jul. 12, 2012

(65) Prior Publication Data
US 2014/0291894 A1    Oct. 2, 2014

(30) Foreign Application Priority Data
Jan. 7, 2011    (FR) ..................................... 11 50131

(51) Int. Cl.
C08L 23/14    (2006.01)
B29C 45/00    (2006.01)
C08J 5/04    (2006.01)

(52) U.S. Cl.
CPC .......... C08L 23/14 (2013.01); B29C 45/0001 (2013.01); C08J 5/045 (2013.01); C08J 2323/14 (2013.01)

(58) Field of Classification Search
CPC ....... C08J 5/045; B29C 45/0001; C08L 23/14
See application file for complete search history.

(56) References Cited

U.S. PATENT DOCUMENTS

| 2001/0011118 A1* | 8/2001 | Sanada | C08L 71/123 525/132 |
| 2003/0176543 A1* | 9/2003 | Patel | C08G 65/46 524/115 |
| 2004/0034166 A1 | 2/2004 | Botros | |
| 2004/0059042 A1* | 3/2004 | Hartle | C08L 25/06 524/500 |
| 2004/0214925 A1 | 10/2004 | Sigworth | |
| 2013/0123431 A1* | 5/2013 | Filipe | C08L 23/10 525/240 |
| 2015/0218355 A1* | 8/2015 | Hemmeter | C08L 23/142 521/91 |

FOREIGN PATENT DOCUMENTS

| CN | 101198451 A | 6/2008 |
| CN | 101568589 A | 10/2009 |
| EP | 1741725 | * 1/2007 |
| EP | 1990362 A1 | 11/2008 |
| WO | WO2004016667 A2 | 2/2004 |
| WO | 2006108256 A1 | 10/2006 |
| WO | WO2006108256 A1 | 10/2006 |
| WO | 2008074715 A1 | 6/2008 |

OTHER PUBLICATIONS

International Search Report for application No. PCT/EP2012/050179, dated Feb. 2, 2012, 2 pages.
Written Opinion for application No. PCT/EP2012/050179, dated Jun. 1, 2012, 4 pages (in French only).
Santos, et al., Natural Fibers Plastic Composites for Automotive Applications, published on-line at https://www.researchgate.net/publication/238094546_Natural_fibers_plastics_composites_for_automotive_applications, accessed Mar. 2, 2016.
Impact modifiers: how to make your compound tougher, Plastics Additives & Compounding, May/Jun. 2004, pp. 46-49.
Abaca, Wikipedia article, http://en.wikipedia.org/wiki/Abac%C3%A1, accessed Dec. 19, 2016, last updated Dec. 16, 2016.
Dhal et al., Processing and Properties of Natural Fiber Reinforced Polymer Composite, Journal of Materials, 2013.
Extract of PVC Handbook, Charles E. Wilkes, in Chinese with English summary, 2008, 9 pages.
Chinese Office Action, in Chinese with English translation, corresponding to CN application No. 201280008927.9, dated Oct. 23, 2015, 19 pages.

* cited by examiner

*Primary Examiner* — Jeffrey C Mullis
(74) *Attorney, Agent, or Firm* — Reising Ethington P.C.

(57) ABSTRACT

The invention relates to an injectable composite material comprising:
(a) 28 to 95% by weight of a polypropylene-polyethylene copolymer;
(b) 0 to 10% by weight of a flow enhancer;
(c) 1 to 20% by weight of an impact modifier;
(d) 1 to 20% by weight of a compatibilizing agent; and
(e) 3 to 70% by weight of natural fibers,
wherein the polypropylene-polyethylene copolymer forms a matrix.
It also relates to a method for preparing this composite material as well as to a method for its use for manufacturing parts by injection or by overmolding.

14 Claims, No Drawings

INJECTABLE COMPOSITE MATERIAL REINFORCED BY NATURAL FIBERS

TECHNICAL FIELD

The present invention relates to a reinforced composite material, notably for manufacturing parts in the automotive field.

BACKGROUND

Within the scope of seeking reduction in the pressure of a product on resources and on the environment throughout its lifetime, from the extraction of raw materials to its end-of-life processing, the use of green materials from the plant world is particularly sought.

Thus, from WO 2006/108256, the association of hemp fibers with a thermoplastic polymer, notably a polypropylene is known for preparing an injectable material.

The obtained composite materials are interesting but their properties further have limits notably as regards impact resistance. Moreover, they do not always meet the requirements specific to the automotive field like the requirements of automobile odor and rejection of volatile compounds.

SUMMARY AND DETAILED DESCRIPTION

An object of the present invention is to propose such an injectable composite material, improved notably with regard to the impact resistance, as compared with polypropylene with a mineral filler.

This object is achieved with a composite material comprising:
(a) 28 to 95% by weight of a polypropylene/polyethylene copolymer;
(b) 0 to 10% by weight of a flow enhancer, notably a polyolefin such as homopolymeric polyethylene or polypropylene;
(c) 1 to 20% by weight of an impact modifier;
(d) 1 to 20% by weight of a compatibilizing agent; and
(e) 3 to 70% by weight of natural fibers,
wherein the polypropylene-polyethylene copolymer forms a matrix.

Because of its technical profile, notably as regards impact resistance, such a material allows savings in mass by 3 to 50% as compared with polypropylene with a conventional mineral filler, with a reduction in thickness of the parts obtained by injection, low-pressure, high pressure injection, injection by compression and overmolding. As an example, the thickness of an injected part of 2.5 mm may be reduced by 0.5 mm, i.e. 25% savings in mass.

In the present discussion, the term of "composite material" is meant to cover heterogeneous materials associating several types of materials which do not mix. Particularly targeted materials are composite materials consisting of polymers based on hydrocarbons and generally obtained via a synthesis route from petroleum and from polymers based on carbohydrates, with extracts or derivatives of natural products. Particularly targeted materials are materials associating a polyolefinic polymer with fibers of natural origin, as defined hereafter. The different phases of a composite material may be detected under the optical microscope.

By the term of "fluidity index" (FI), often called MFI from the acronym for "Melt Flow Index", is meant the hot fluidity of a polymer as evaluated by the flow rate of the molten polymer at a given temperature, through a standardized capillary for a given period, generally 10 minutes, under a load of 2.16 kg, under the conditions indicated in the international standard ISO 1133.

By the term of "copolymer", as opposed to the term of "homopolymer", is meant to refer to a polymer stemming from the copolymerization of at least two types of chemically different monomers, called comonomers. The copolymers obtained by copolymerization of two monomers are sometimes called bipolymers, those obtained from three monomers are called terpolymers and those obtained from four monomers are called quaterpolymers. The copolymer is therefore composed of at least two recurrent units. Depending on how the recurrent units are distributed in the macromolecular chains, a distinction is made between copolymers with random, alternating and statistical sequences and sequenced copolymers or block copolymers. Moreover, copolymers stemming from grafting are known.

The term of "impact modifier" is meant to cover agents added to a material with view to improving the properties as regards resistance to impacts. These modifiers are polymers or molecules which form multiphase systems with the matrix or which are chemically react with the matrix, thereby improving its resilience.

The term of "compatibilizing agent" is aimed at compounds having a different chemical structure at their two ends respectively with a particular affinity for two components of a heterogeneous material thus improving the compatibility between both of these components.

The term of "natural fibers" is aimed at fiber materials stemming from materials of plant or animal origin.

Finally, the term of "matrix" is intended to refer in a composite material to the continuous phase in which the other components are dispersed. Generally but not always, the matrix is formed by the component present in a majority proportion.

The composite material described herein contains as a matrix a polypropylene-polyethylene copolymer.

Indeed, it is found that this copolymer gives the composite material an impact resistance greater than that of those traditionally used, which include a polypropylene matrix.

Preferably, the composite material at its specific transformation temperature has a viscosity ranging from 5 Pa·s to 1,000 Pa·s in a shearing rate range specific to the injection ranging from 100 $s^{-1}$ to 50,000 $s^{-1}$. By means of this characteristic, the composite material is injectable. It may then be used in most known injection methods, such as for example low pressure, high pressure injection, sandwich injection, dual injection, injection by compression and overmolding. The specific transformation temperature is the temperature at which the material is sufficiently fluid so as to be injectable into a cavity (for example between 220 and 240° C. for polypropylenes and between 260 and 280° C. for polycarbonates (PC) and acrylonitrile butadiene styrene (ABS) polymers. This specific transformation temperature is specific to each material.

Composite materials including a matrix-based on these copolymers including 10 to 90 mol % of ethylene units are particularly preferred.

The composite material moreover includes from 0 to 10% by weight of a flow enhancer. This flow enhancer is preferably a polymer with a low Flow Index (FI), preferably a polymer having a flow Index comprise between 200 and 2000 g/10 mins at 230° C. under a load of 2.16 kg and in particular a homopolymer or copolymer polyolefin, notably a homo- or co-polymer polyethylene or further a homo- or co-polymer polypropylene.

The flow enhancer, if necessary, allows an increase in the fluidity of the material so as to make it injectable. According to the choice made, it may moreover contribute to improving the impact resistance and to reducing the volatile compounds released by the material. By volatile compounds, one refers to the whole of the emissions generated by a material which may produce an odor or volatile organic compounds.

Thus, the flow enhancers may be notably obtained by metallocene catalysis or Ziegler Natta catalysis. Advantageously, the flow enhancer is a polyolefin obtained by metallocene catalysis. Indeed, it is seen that metallocene catalysis leads to polyolefins for which the melting temperature is much lower than that of a polyolefin obtained by Ziegler Natta catalysis, thus leading to much greater fluidity of the material. Further, metallocene catalysis introduces a much narrower distribution of the molecular masses and therefore a lower content of low mass molecules thereby reducing the content of compounds which may be released. It is therefore not necessary, as in the case of polyolefins obtained by Ziegler Natta catalysis, to use chemical means, such as the breaking of chains by acid etching (e.g. maleic anhydrides) for attaining high fluidities. This technique then generates many volatile compounds.

The selection of such flow enhancers consequently contributes to making the composite material injectable—because of the smaller chain length of the compounds—and to meeting the requirements with regard to the release of volatile compounds of automotive manufacturers because of a low content of compounds which may be released from the material.

The more preferred flow enhancers is polypropylene, preferably the homopolymer polypropylene obtained by metallocene catalysis.

Moreover, polyethylene, and in particular polyethylene modified by alkenes or any other type of graft, is a more preferred flow enhancer for certain applications since it allows improvement in the performances in terms of impact resistance, in addition to the impact modifiers discussed hereafter.

The material further contains from 1 to 20% by weight, preferably 2 to 10 and most preferably 4 to 8% by weight of impact modifier.

By adding the impact modifier it is possible to increase the impact resistance of the composite material by up to 200%.

The impact modifier is preferably an elastomeric compound, notably selected from the group formed by ethylene-propylene-diene (EPDM) monomer, ethylene-propylene (EPM) monomer, ethylene-propylene rubber (EPR), elastomeric polyolefins (POE), copolymers and terpolymers based on ethylene and propylene, nitrile-butadiene rubber (NBR), isobutylene (IB), chlorinated rubber, poly(styrene-butadiene-styrene) (SBS), styrene-ethylene-butene-styrene copolymer (SEBS), isobutylene-isoprene rubber (IIR), styrene-isoprene-styrene copolymer (SIS), chlorinated polyethylene (CM), isoprene, ethylene-butene, mixtures and derivatives thereof, notably grafted with maleic acid and/or maleic acid anhydride.

The composite material moreover comprises 1 to 20%, preferably 5 to 15% by weight of a compatibilizing agent.

The compatibilizing agent ensures good affinity between the fibers and the other ingredients of the material, notably the polymeric matrix and thus gives the possibility of obtaining a homogeneous mixture.

As a compatibilizing agent, a compound selected from polyolefins grafted with polar groups may be contemplated. As polyolefins, the use of (co)polymers of polypropylene may notably be contemplated.

Polyolefins grafted with a carboxylic acid or one of its esters or anhydrides are more preferred. Among carboxylic acids useful for grafting, mention may notably be made of maleic acid and maleic anhydride.

The composite material further contains 3 to 70%, preferably 5 to 40% and most particularly 10 to 30% by weight of natural fibers.

The presence of fibers notably allows an increase in the thermal resistance of the material.

Even in the presence of these natural fibers, the material remains injectable. However, an optimum injection behavior is observed when the composite material contains less than 30% by weight of natural fibers.

Natural fibers are preferably selected from the group formed by cotton, flax, hemp, manila hemp or abaca, banana tree, jute, ramie, raffia, sisal, broom, wool, alpaga, mohair, cachemire, angora, silk, bamboo, miscanthus, kenaf, coconut, agave, sorghum, switch-grass and wood.

The length of the natural fibers may greatly vary depending on the contemplated applications for the composite material. For the manufacturing of indoor parts for the automobile, fibers with an average length comprised between 0.1 and 10 mm, are preferably used.

The fibers are preferably used after drying at a water content of less than 5% by weight. They may then be subject to a surface treatment in order to increase compatibility with the matrix, in particular with silanes.

The following method may be used for preparing the composite material described above:
 (i) introducing polymeric components (a) to (d) and at least one portion of the component (e) in the suitable mixing device;
 (ii) melting and mixing said components in the mixing device;
 (iii) if necessary, introducing the remainder of the component (e) into a mixture;
 (iv) melting and final mixing of the components; and
 (v) granulation.

Preferably the steps (i) to (v) are carried out in a screw extruder.

The described composite material may be used for the manufacturing of parts by injection, notably intended for the interior of automobiles.

The increase in the thermal resistance notably obtained by means of the fibers is particularly of interest for applications of the vehicle indoor parts type such as for example dashboards, door panels. Indeed, these vehicle indoor parts may be subject to high temperatures which may attain 120° C., especially in the area close to the glazed surfaces.

The injection of parts by using the described composite material may be carried out conventionally for example as follows.

The granule-shaped plastic material is introduced into a heated and temperature-controlled plasticizing screw and softened under the combined action of the screw and of temperature in order to attain at the front of the screw a viscous state, forming the reserve of material ready to be injected.

The material present at the front of the plasticizing screw is then injected under high pressure into the inside of a mold (or cavity) having the shape of the desired part and for which the temperature is less than the transformation temperature.

Constant pressure is applied for a determined time so as to continue to feed the imprints in order to compensate for shrinkage of the material during its cooling. The part is then cooled for a few seconds and then ejected.

The following example, purely given as an illustration, describes embodiments of the above-discussed composite material, its method of manufacturing, and its use.

EXAMPLE

In a twin-screw extruder, are introduced through a first hopper, 39 kg of a copolymer of propylene and ethylene, 8 kg of polypropylene obtained by metallocene catalysis (MFI 400) and as an additive, 20 kg of an impact modifier (EP5 1060 sold by HIFAX) and 3 kg of a compatibilizing agent and then 30 kg of retted hemp fibers, half of which being introduced by means of a second hopper located downstream. The components and their respective proportions are indicated in Table 1 below.

TABLE 1

Composition of the composite material

| Component | Proportion [% by weight] |
|---|---|
| Propylene-ethylene copolymer | 39 |
| Polypropylene | 8 |
| Impact modifier | 20 |
| Compatibilizing agent | 3 |
| Natural fibers | 30 |

The mixture is subject to compounding by extrusion under the following conditions:
Temperature: 180° C.
Pressure: 5 to 30 bars The composite material is obtained as granules which may be used for manufacturing parts by injection.

With the formulation of the composite material, it is possible to obtain a material having a superior technical profile as compared with standard materials, which allows a reduction in the thickness of the parts by 2.5 mm to 2 mm. Moreover, taking into account the density reduction of the material according to the invention as compared with the standard material, the savings in mass attains about 25%. The table below groups the key properties of the prepared composite.

TABLE 2

Profile of the mechanical, thermal and flow properties

| Properties | Unit | Value |
|---|---|---|
| Elasticity modulus at 23° C. (ISO527) | MPa | 2900 |
| Impact resistance according to Izod at 23° C. (ISO180)] | kJ/m2 | 6 |
| HDT A (1.8 MPa) (ISO 75) | ° C. | 80 |
| HDT B (0.45 MPa) (ISO 75) | ° C. | 135 |
| Spiral flow length | cm | 80 |

These properties give the possibility of using this composite material for manufacturing parts intended for the indoor trim of automobiles, notably dashboards, door panels, whether they are coated or not, but also parts intended for the structure of indoor trim parts, for example defrosting pipes or further reinforcement parts adapted in order to resist impacts of one of the members of the passengers against these so-called reinforcement parts upon an impact of a vehicle against another vehicle.

The invention claimed is:

1. An injectable composite material comprising:
   (a) 28 to 95% by weight of a copolymer of ethylene and propylene;
   (b) a flow enhancer in an amount of no more than 10% by weight;
   (c) 1 to 20% by weight of an impact modifier;
   (d) 1 to 20% by weight of a compatibilizing agent; and
   (e) 3 to 70% by weight of natural fibers having an average length between 0.1 and 10 mm,
   wherein the copolymer of ethylene and propylene forms a matrix and includes 10 to 90 mol % of ethylene.

2. The composite material according to claim 1, wherein the flow enhancer is a polymer having a fluidity index from 200 to 2,000 g/10 mins at 230° C. under a load of 2.16 kg.

3. The composite material according to claim 1, wherein the flow enhancer is a polyolefin.

4. The composite material according to claim 1, wherein the flow enhancer is a polyolefin obtained by metallocene catalysis.

5. The composite material according to claim 1, wherein the flow enhancer is selected from the group formed by a polypropylene homopolymer, a polypropylene copolymer, a polyethylene homopolymer and a polyethylene copolymer.

6. The composite material according to claim 1, having a viscosity ranging from 5 Pa·s to 1,000 Pa·s in a shearing rate ranging from $100 \text{ s}^{-1}$ to $50,000 \text{ s}^{-1}$ at a temperature at which the material is sufficiently fluid so as to be injectable into a cavity.

7. The composite material according to claim 1, wherein the impact modifier is selected from the group formed by ethylene-propylene-diene monomer (EPDM), ethylene-propylene monomer (EPM), ethylene-propylene rubber (EPR), elastomeric polyolefins (POE), copolymers and terpolymers based on ethylene and propylene, nitrile-butadiene rubber (NBR), isobutylene (IB), chlorinated rubber, poly(styrene-butadiene-styrene) (SBS), styrene-ethyl ene-butene-styrene copolymer (SEBS), isobutylene-isoprene rubber (IIR), styrene-isoprene-styrene copolymer (SIS), chlorinated polyethylene (CM), isoprene polymer, ethylene-butene polymer, and derivatives thereof, optionally grafted with maleic acid and/or maleic acid anhydride.

8. The composite material according to claim 1, wherein the compatibilizing agent is selected from the group formed by polyolefins grafted with a carboxylic acid or one of its esters or anhydrides.

9. The composite material according to claim 1, wherein the natural fibers are selected from the group formed by cotton, flax, hemp, manila hemp or abaca, banana tree, jute, ramie, raffia, sisal, broom, wool, alpaca, mohair, cashmere, angora, silk, bamboo, miscanthus, kenaf, coconut, agave, sorghum, switch-grass and wood.

10. The composite material according to claim 1, comprising 10 to 30% by weight of natural fibers.

11. A method for preparing a composite material according to claim 1, comprising the steps:
   (i) introducing the polymeric components (a) to (d) and at least one portion of the component (e) into a suitable mixing device;
   (ii) melting and mixing said components in the mixing device;
   (iii) introducing any remainder of the component (e) into the mixture;
   (iv) melting and mixing the components; and
   (v) granulation.

12. The preparation method according to claim 11, wherein the steps (i) to (v) are carried out in a screw extruder.

13. A method comprising the step of manufacturing a part by injection molding using the composite material of claim 1.

14. The method according to claim 13, wherein the manufacturing step comprises manufacturing a vehicle interior part using the composite material.

* * * * *